(12) United States Patent
Patten

(10) Patent No.: US 9,079,712 B2
(45) Date of Patent: Jul. 14, 2015

(54) SUBSIDENCE CONTROL SYSTEM

(75) Inventor: James W. Patten, Sandy, UT (US)

(73) Assignee: Red Leaf Resources, Inc., South Jordan, UT (US)

( * ) Notice: Subject to any disclaimer, the term of this patent is extended or adjusted under 35 U.S.C. 154(b) by 811 days.

(21) Appl. No.: 12/949,643

(22) Filed: Nov. 18, 2010

(65) Prior Publication Data

US 2011/0286796 A1  Nov. 24, 2011

Related U.S. Application Data

(60) Provisional application No. 61/263,261, filed on Nov. 20, 2009.

(51) Int. Cl.
*B65G 5/00* (2006.01)
*E02D 31/00* (2006.01)

(52) U.S. Cl.
CPC ............... *B65G 5/00* (2013.01); *E02D 31/002* (2013.01)

(58) Field of Classification Search
CPC ................................. E02D 31/002; B65G 5/00
USPC .............. 405/55, 57, 129.35, 129.55, 129.57, 405/129.6, 129.75; 588/16, 17
See application file for complete search history.

(56) References Cited

U.S. PATENT DOCUMENTS

| | | | |
|---|---|---|---|
| 3,068,654 A * | 12/1962 | Warren | 405/55 |
| 3,438,204 A * | 4/1969 | Cleary | 405/210 |
| 3,485,049 A * | 12/1969 | Rohrer | 405/57 |
| 3,704,593 A * | 12/1972 | St. Clair | 405/55 |
| 3,803,850 A * | 4/1974 | Hendrix | 405/53 |
| 4,067,390 A | 1/1978 | Camacho et al. | |
| 4,176,882 A | 12/1979 | Studebaker et al. | |
| 4,221,502 A | 9/1980 | Tanikawa | |
| 4,239,416 A * | 12/1980 | Borca et al. | 405/53 |
| 4,272,127 A | 6/1981 | Hutchins et al. | |

(Continued)

FOREIGN PATENT DOCUMENTS

| EP | 0034023 | | 8/1981 |
|---|---|---|---|
| GB | 1439734 A | * | 6/1976 |
| WO | WO 2005/037536 | | 4/2005 |

OTHER PUBLICATIONS

PCT/US2010/05762; filed Nov. 18, 2010; Red Leaf Resources, Inc., et al.; search report dated Aug. 14, 2012.

(Continued)

*Primary Examiner* — Tara M. Pinnock
(74) *Attorney, Agent, or Firm* — Thorpe North & Western, LLP

(57) ABSTRACT

A method of maintaining structural integrity of a subsiding earthen fluid containment structure is disclosed and comprises forming a lined containment infrastructure (100) including a convex bulged crown portion (120), floor portion (110) and sidewall portions (115) which enclose a comminuted earthen material (126) within an enclosed volume (125) such that fluid flow from the lined containment compound is restricted. The bulged crown flattens, thickens and diminishes in surface area during subsidence of the comminuted earthen material as fluid is removed. The bulged crown is shaped to avoid tensile stresses which may otherwise result in breach or failure of lined containment during subsidence. Further, the lined containment structure can include an inner insulative layer and an outer impermeable seal layer having unique contributions as described in more detail herein.

20 Claims, 2 Drawing Sheets

(56) References Cited

U.S. PATENT DOCUMENTS

| | | | |
|---|---|---|---|
| 4,294,563 A | 10/1981 | Kilburn | |
| 4,375,985 A | 3/1983 | Guillaud et al. | |
| 4,465,401 A | 8/1984 | Stoddord et al. | |
| 4,483,396 A | 11/1984 | Kennelly | |
| 4,502,539 A | 3/1985 | Grupping | |
| 4,531,783 A | 7/1985 | Ricketts | |
| 4,580,925 A * | 4/1986 | Matich et al. | 588/250 |
| 4,744,700 A | 5/1988 | Andy et al. | |
| 4,747,642 A | 5/1988 | Gash et al. | |
| 4,908,129 A * | 3/1990 | Finsterwalder et al. | 210/170.07 |
| 5,567,932 A | 10/1996 | Staller et al. | |
| 5,961,437 A * | 10/1999 | Smith et al. | 588/249 |
| 5,964,093 A * | 10/1999 | Heinemann et al. | 62/45.1 |
| 5,980,446 A | 11/1999 | Loomis et al. | |
| 6,691,472 B2 | 2/2004 | Hubert | |
| 7,394,023 B2 | 7/2008 | Rizzuto, Jr. | |
| 7,862,705 B2 | 1/2011 | Dana et al. | |
| 2007/0039729 A1 | 2/2007 | Watson et al. | |
| 2008/0122286 A1 | 5/2008 | Brock et al. | |
| 2008/0190818 A1 | 8/2008 | Dana et al. | |
| 2010/0232881 A1 * | 9/2010 | Carter, Jr. | 405/55 |

OTHER PUBLICATIONS

Landis et al.; Environmental Sealants, "Wyoming" Bentonite Pond Liners and Sealants; Oct. 13, 2009; Sorptive Minerals Institute; http://www.sorptive.org/Bentonite.html; 2 pages.

* cited by examiner

SUBSIDENCE CONTROL SYSTEM

RELATED APPLICATION

This application claims the benefit of U.S. Provisional Patent Application No. 61/263,261, filed Nov. 20, 2009, which is incorporated herein by reference.

BACKGROUND OF THE INVENTION

Global and domestic demand for fossil fuels continues to rise despite price increases and other economic and geopolitical concerns. As such demand continues to rise, research and investigation into finding additional economically viable sources of fossil fuels correspondingly increases. Historically, many have recognized the vast quantities of energy stored in oil shale, coal and tar sand deposits, for example. However, these sources remain a difficult challenge in terms of economically competitive recovery. Canadian tar sands have shown that such efforts can be fruitful, although many challenges still remain, including environmental impact, product quality, production costs and process time, among others.

Estimates of world-wide oil shale reserves range from two to almost seven trillion barrels of oil, depending on the estimating source. Regardless, these reserves represent a tremendous volume and remain a substantially untapped resource. A large number of companies and investigators continue to study and test methods of recovering oil from such reserves. In the oil shale industry, methods of extraction have included underground rubble chimneys created by explosions, in-situ methods such as In-Situ Conversion Process (ICP) method (Shell Oil), and heating within steel fabricated retorts. Other methods have included in-situ radio frequency heating (microwaves), and "modified" in-situ processes wherein underground mining, blasting and retorting have been combined to make rubble out of a formation to allow for better heat transfer and product removal.

Among typical oil shale processes, all face tradeoffs in economics and environmental concerns. No current process alone satisfies economic, environmental and technical challenges. Moreover, global warming concerns give rise to additional measures to address carbon dioxide ($CO_2$) emissions that are associated with such processes. Methods are needed that accomplish environmental stewardship, yet still provide high-volume cost-effective oil production.

Below ground in-situ concepts emerged based on their ability to produce high volumes while avoiding the cost of mining. While the cost savings resulting from avoiding mining can be achieved, the in-situ method requires heating a formation for a long period of time due to the extremely low thermal conductivity and high specific heat of solid oil shale. Perhaps the most significant challenge for any in-situ process is the uncertainty and long-term potential of water contamination that can occur with underground freshwater aquifers. In the case of Shell's ICP method, a "freeze wall" is used as a barrier to keep separation between aquifers and an underground treatment area. Long-term prevention of contamination has yet to be conclusively demonstrated and there are few remedies should a freeze wall fail, so other methods are desirable to address such environmental risks.

One method and system that addresses these problems is disclosed and claimed in U.S. application Ser. No. 12/028,569, filed Feb. 8, 2008 which is incorporated herein in its entirety by reference. In that application, a method of recovering hydrocarbons from hydrocarbonaceous materials is disclosed including forming a constructed permeability control infrastructure. This constructed infrastructure defines a substantially encapsulated volume. A mined hydrocarbonaceous material, such as oil shale, can be introduced into the control infrastructure to form a permeable body of hydrocarbonaceous material. The permeable body can be heated sufficient to reform and remove hydrocarbons therefrom leaving a lean shale or other earthen material. During heating the hydrocarbonaceous material can be substantially stationary. Removed hydrocarbons can be collected for further processing, use in the process as supplemental fuel or additives, and/or direct use without further treatment. The lean shale or other material may remain in the infrastructure. The control infrastructure can include fully lined impermeable walls or impermeable sidewalls with a substantially impermeable floor and cap.

It has been recognized by the present inventors that a potential drawback to this method and system lies in the subsidence of the hydrocarbon lean materials within the infrastructure over time causing the cap and any overburden to settle below the initial grade, potentially to the extent of creating a concave surface. Settling below grade of the infrastructure may be undesirable from an environmental or reclamation point of view. Further, materials surrounding the capsule often possess minimal or no tensile strength. These materials may be placed in tension parallel to the capsule crown surface if the capsule surface settles below a horizontal plane to produce an increasingly concave surface and may subsequently separate or rupture as the cap of the infrastructure settles causing exposure of the contents within the infrastructure to the outside environment. Exposure of lean shale or other earthen materials, which may contain minimal amounts of unremoved hydrocarbons, heavy metals and the like may be undesirable. Also, gases trapped within the infrastructure or which may later vaporize may also be released.

For these and other reasons, the need remains for methods and systems which can enable improved recovery of hydrocarbons from suitable hydrocarbon-containing materials while providing for encapsulation and containment of the hydrocarbon lean or and other earthen materials that are subject to subsidence while avoiding below grade settling of the cap or cover of the infrastructure and overburden.

SUMMARY

A sealed containment system for subsiding earthen materials is provided comprising a lined containment infrastructure including a floor portion, convex bulged crown portion, and continuous sidewall portion connecting the floor portion and the crown portion to form a sealed enclosed volume which restricts flow of fluid outside the lined containment infrastructure. The enclosed volume has at least one fluid outlet and the bulged crown has an upwardly convex domed profile. The enclosed volume is filled with a comminuted hydrocarbon containing material such as oil shale, tar sands, coal and the like. The lined containment of the infrastructure is formed such that, as hydrocarbons are removed from the infrastructure and as subsidence within the enclosed volume occurs, the enclosed volume decreases with the concomitant compression of the convex bulged crown resulting in decreased height and surface area of the crown and thickening of multilayered depth of the crown. The enclosed volume remains sealed from the outside environment and the convex bulged crown is engineered such that the bulged crown does not substantially progress from convex to concave (compression to tension) before settling is complete and the final grade is reached.

The floor, convex bulged crown and sidewall comprises multiple permeability control layers as more fully described hereinafter. The layers can include an inner insulative layer such as a fines layer. An outer impermeable seal layer is also typically included that is impermeable to fluid transport and provides fluid containment. One example of such a seal layer is bentonite amended soil layer. If desired an optional high temperature asphalt seal layer inwardly adjacent the insulative layer can form the inner surface of the infrastructure.

The inner surfaces of the sidewall, floor and crown of the infrastructure are permeable to gases, vapors or other fluids from within the enclosed volume that can be condensed within the fines layer and collected in any desired manner for further processing. Each layer forming the infrastructure has a specific function as will be hereinafter explained and include at least an insulative layer and a seal layer.

Additional features and advantages of the invention will be apparent from the following detailed description, which illustrates, by way of example, features of the invention.

Figure 1:
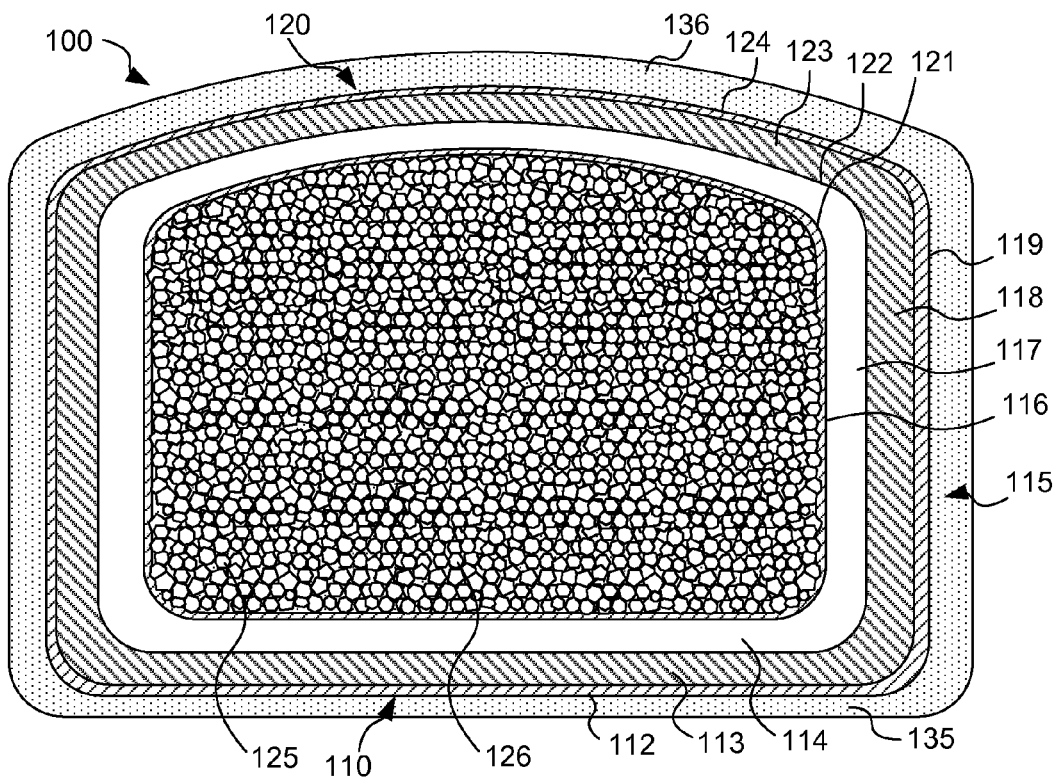
FIG. 1 is a side cutaway view of an infrastructure according to one embodiment showing, prior to processing for hydrocarbon removal, the enclosed volume filled with comminuted hydro carbonaceous material and further showing various layers forming the floor, sidewall and convex bulged crown extending above the existing grade.

Dimensions, materials and configurations are presented in the figures merely for convenience in describing the invention and may not represent accurate relative proportions or alternative variations that are considered part of the invention. Some aspects may be exaggerated or vary from practicing embodiments in order to facilitate clarity.

DETAILED DESCRIPTION

Reference will now be made to exemplary embodiments and specific language will be used herein to describe the same. It will nevertheless be understood that no limitation of the scope of the invention is thereby intended. Alterations and further modifications of the inventive features described herein, and additional applications of the principles of the invention as described herein, which would occur to one skilled in the relevant art and having possession of this disclosure, are to be considered within the scope of the invention. Further, before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

DEFINITIONS

In describing and claiming the present invention, the following terminology will be used.

The singular forms "a," "an," and "the" include plural references unless the context clearly dictates otherwise. Thus, for example, reference to "a wall" includes reference to one or more of such structures, "a permeable body" includes reference to one or more of such materials, and "a heating step" refers to one or more of such steps.

As used herein "existing grade" or similar terminology refers to the grade or a plane parallel to the local surface topography of a site containing an infrastructure as described herein which infrastructure may be above or below the existing grade. However, for purposes of illustration existing grade will be described as that flat plane grade substantially below which the crown surface of an infrastructure of the invention should not move at any time following hydrocarbon removal and subsidence of materials within the infrastructure, thus precluding the formation of a concave crown surface or tensile stress in the crown parallel to or along the crown surface.

As used herein, and when specifically referenced, "below grade" and "subgrade" refer to a foundation of supporting soil or earth beneath a constructed infrastructure.

As used herein, "conduits" refers to any passageway along a specified distance that can be used to transport materials and/or heat from one point to another point. Although conduits can generally be circular conduits, other non-circular conduits can also be useful. Conduits can advantageously be used to introduce fluids into and/or extract fluids from the permeable body, convey heat through transfer of fluids, and/ or to transport natural gas burners radio frequency devices, fuel cell mechanisms, resistance heaters, or other devices.

The lined containment infrastructure is generally substantially free of undisturbed geological formations, although the infrastructure can be formed adjacent or in direct contact with an undisturbed formation.

As used herein, "comminuted" refers to breaking a formation or larger mass into pieces. A comminuted mass can be rubbilized or otherwise broken into fragments.

As used herein, "hydrocarbonaceous material" refers to any hydrocarbon-containing material from which hydrocarbon products can be extracted or derived. For example, hydrocarbons may be extracted directly as a liquid, removed via solvent extraction, directly vaporized or otherwise removed from the material. However, many hydrocarbonaceous materials contain kerogen, bitumen or various grades of coal that can be converted to a smaller molecular weight hydrocarbon liquid or gas through heating and pyrolysis. Hydrocarbonaceous materials can include, but is not limited to, oil shale, tar sands, coal, lignite, bitumen, peat, and other organic materials.

As used herein, "lean material" or similar terminology refers to a treated hydrocarbonaceous material, such as oil shale, tar sands, and the like, from which some or all of the hydrocarbons have been removed.

As used herein, "permeable body" refers to any mass of comminuted hydrocarbonaceous material or other earthen material having a relatively high permeability that exceeds permeability of a solid undisturbed formation of the same composition. Suitable permeable bodies can typically have greater than about 10% void space and often have void space from about 20% to 40%, although other ranges may be suitable. Allowing for high permeability facilitates, for example, through the incorporation of large irregularly shaped particles, heating of the body through gas convection as the primary heat transfer while also substantially reducing costs associated with crushing to very small sizes, e.g. below about 1 to about 0.5 inch.

As used herein, "wall", "walls", "sidewall" or "sidewalls" refer to a constructed continuous multilayered wall having insulative properties and a permeability control contribution to confining material within an enclosed volume defined at least in part by control walls. Walls are typically vertical but can be oriented in any functional manner. Ceilings, floors and other contours and portions of the infrastructure defining the encapsulated volume can also be "walls" as used herein unless otherwise specified.

As used herein "bulged crown" refers to the multilayered convex top or roof portion at the upper end of an infrastructure positioned over comminuted earthen material and contiguous with the upper end of the wall or sidewall defining the upper portion of the enclosed space.

As used herein "floor" refers to the bottom of the enclosed space upon which the wall or sidewall rests or is secured. The floor portion of the infrastructure is generally contiguous with the wall portions.

As used herein the terms "bulged crown", "wall" and "floor" are used for convenience in describing positioning in the infrastructure but the various layers forming the crown, wall and floor can generally be one continuous layer.

As used herein, "mined" refers to a hydrocarbonaceous or other earthen material which has been removed or disturbed from an original stratigraphic or geological location to a second and different location or returned to the same location. Typically, mined material can be produced by rubbilizing, crushing, explosively detonating, drilling or otherwise removing material from a geologic formation.

As used herein, "fines" refers to an insulative control layer forming one portion of a floor, bulged convex crown or wall comprising particulate inorganic or earthen materials such as gravel, crushed rock, sand or similar materials typically having a particle size of less than two inches in diameter.

As used herein "bentonite amended soil" or "BAS" refers a seal control layer forming one portion of a floor, bulged crown or wall. The BAS layer typically comprises, by weight, about 6-12% bentonite clay; 15-20% water mixed with soil or aggregate often with a particle sizes less than 1" and distributed downward to the finest material readily available, although variations can be made from these general guidelines as long as the hydrated BAS can maintain a functional seal. In other words, the BAS layer is a hydrated layer. When hydrated, the bentonite component swells to several times the dry volume of the bentonite clay thus sealing the soil such that this material is plastic and malleable.

As used herein "suspended particulates" refers to fine inorganic particulates that are often found suspended in liquid hydrocarbons following production of these liquids. Although some of these suspended particulates can be readily filtered, a substantial portion of some suspended particulates can be very difficult to remove using conventional approaches.

As used herein, "substantially stationary" refers to nearly stationary positioning of solid materials with a degree of allowance for subsidence, expansion, and/or settling as hydrocarbons are removed from the hydrocarbonaceous material from within the enclosed volume to leave behind lean material. In contrast, any circulation and/or flow of solid hydrocarbonaceous material such as that found in fluidized beds or rotating retorts involves highly substantial movement and handling of solid particles of hydrocarbonaceous material.

As used herein, "substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack of an identified element or agent in a composition. Particularly, elements that are identified as being "substantially free of" are either completely absent from the composition, or are included only in amounts which are small enough so as to have no measurable effect on the results of the composition.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, and sub-ranges such as 10 to 50, 20 to 100, etc.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Sealed Containment Systems

A sealed containment infrastructure is disclosed which can be used in the removal of hydrocarbons or other materials from comminuted hydro carbonaceous or other earthen material. The containment infrastructure is constructed such that, following hydrocarbon removal, the hydrocarbon lean materials are retained in place within the infrastructure and wherein the integrity of the infrastructure is maintained following subsidence of the comminuted materials. The sealed containment system comprises a lined containment infrastructure including a floor portion, a convex bulged crown portion, and a sidewall portion connecting the floor and the crown to form an enclosed volume which contains the comminuted materials and which restricts flow of fluid outside the lined containment infrastructure. The containment infrastructure has at least one fluid outlet and may have multiple fluid outlets and inlets depending upon how the system is utilized in the removal of hydrocarbons or other materials. The bulged crown has an upwardly domed convex profile defining the upper end of the enclosed volume and which is contiguous with the sidewall. The floor is also contiguous with the sidewall and may substantially horizontal or sloped toward a drain as desired for the collection of hydrocarbon fluids extracted during processing of the comminuted hydrocarbonaceous materials.

As noted in the copending application cited above, a method of recovering hydrocarbons from hydro carbonaceous materials can include forming a constructed permeability control infrastructure. This constructed infrastructure defines a substantially encapsulated volume. A mined or harvested hydrocarbonaceous material, which is solid or at least does not flow freely under introduction conditions, can be introduced into the control infrastructure to form a permeable body of hydrocarbonaceous material. The permeable body can be heated sufficient to remove hydrocarbons therefrom. During heating, the hydrocarbonaceous material is substantially stationary as the constructed infrastructure is a fixed structure. Removed hydrocarbons (including liquids and gases) can be collected for further processing, use in the process, and/or use as recovered. The specific processing steps are adequately disclosed in the prior application incorporated herein and can be readily adapted for use in the containment infrastructure disclosed herein.

Alternatively, fluids can be recovered from earthen material by any number of processes such as, but not limited to, leaching, solvent extraction (e.g. vapor extraction, liquid extraction), bioremediation, chemical oxidation, thermal oxidation, and the like. These processes can be used to remove pollutants, toxic elements, volatile organics, or other undesirable materials, as well as recover valuable materials such as precious metals or other metals, and chemical precursor materials. Thus, the earthen material can include contaminated soil, metal rich ore, municipal waste, and the like. Some of these processes require heating, while others can be performed effectively without heating. Therefore, although the impermeable seal layer is used, any additional layers such as the insulative layer or other layers are optional.

A constructed permeability control infrastructure can include a permeability control impoundment that defines a substantially encapsulated volume. The permeability control impoundment can be substantially free of undisturbed geological formations. Specifically, the permeability control aspect of the impoundment can be completely constructed and manmade as a separate isolation mechanism for prevention of uncontrolled migration of material into or out of the encapsulated volume or it can employ some elements of the surface of an excavation. For example, in some excavations, the floor and walls might have sufficient naturally low impermeability that a bentonite amended soil layer may not be necessary for portions of the infrastructure. However, a fines layer may still be required for insulation.

In one aspect, the lined containment infrastructure can be formed along walls of an excavated hydrocarbonaceous material deposit. For example, oil shale, tar sands, or coal can be mined from a deposit to form a cavity that corresponds approximately to a desired encapsulation volume for a sealed containment system. The excavated cavity can then be used as a form and support for the lined containment infrastructure. In an alternative aspect, a berm can be formed around the outside wall surface of the infrastructure if the infrastructure is partially or substantially above ground level.

Mining and/or excavation of hydrocarbonaceous deposits, the communication thereof, and placement within the infrastructure can be accomplished using any suitable technique such as disclosed in aforementioned application.

The lined infrastructure comprises a floor, a sidewall extending upwardly from the floor and a bulged convex crown extending upwardly and over the sidewall to define an enclosed volume. Each of the floor, sidewall and bulged crown can be made up of a multiplicity of layers comprising at least an inner fines layer or other insulation material and an outer layer of amended bentonite soil or similar fluid barrier material. Optionally, an outer membrane that further prevents passage of fluids outside the infrastructure may be employed as a fluid barrier in addition to the bentonite amended soil. The outer membrane can serve as a secondary back-up seal layer should the primary seal layer fail for any reason. An inner layer of high temperature asphalt or other fluid barrier material may also be optionally applied to the inner surface of the fines layer and define the inner surface of the impoundment.

The combined multilayers forming the containment infrastructure serve to insulate the infrastructure such that heat within the enclosed volume is retained to facilitate the removal of hydrocarbons from the comminuted oil shale, tar sands, or other hydrocarbonaceous material. The insulative properties of the fines layer is such that the temperature gradient across this layer allows the bentonite amended soil layer to be cool enough to remain hydrated. The plasticity of the bentonite amended soil layer seals the infrastructure to prevent the leakage or passage of hydrocarbons outside the infrastructure except via designated conduits, condensation in the fines or other suitable means. The bentonite amended soil layer also functions to prevent the passage of hydrocarbon vapors, hydrocarbon liquids and external water vapors outside of the lined infrastructure. Further, the bentonite amended soil layer is sufficiently plastic to be compressed, particularly in the domed convex crown as subsidence occurs within the enclosed volume thereby retaining the enclosed volume in a sealed state.

In certain situations, the insulative fines layer can be omitted from the infrastructure. For example, when the comminuted material is being subjected to alternate processes that do not require the application or generation of heat, such as solvent extraction or leaching, in order to remove materials therefrom, the insulative layer is optional. In such embodiments, enclosed volume containing the comminuted material is sealed from the outside atmosphere by the hydrated bentonite amended soil layer. Appropriate impermeable membranes can optionally line the inner surface of the hydrated bentonite amended soil layer. Although not always desirable, such an inner lining can prevent interaction between the hydrated bentonite amended soil layer and solvents and/or leaching fluids that might otherwise react with or damage the BAS layer.

When utilized, the insulative layer can most often be formed of a fines layer. Typically, the fines layer can be a particulate material of less than 2" in diameter. Although other materials may be suitable, the fines layer can typically be made up of gravel, sand, crushed lean oil shale or other particulate fines which do not trap or otherwise inhibit fluid flow through the insulative layer. By choosing appropriate particulate materials and layer thickness the fines layer can act as the principal source of insulation. The inner surface of the fines layer, adjacent to the oil shale being roasted is at the temperature of the roasting process. The outer surface of the fines layer, adjacent to the bentonite amended soil layer, remains cool enough, below the boiling point of water, to preserve the hydration of the bentonite amended soil layer. As such, there is a substantial thermal gradient across the fines layer towards the outer surface of the fines layer. Gases produced during the roasting process penetrate this permeable fines layer. As these gases cool sufficiently in the fines layer (below the condensation point of the corresponding gases), liquids can condense from the gases. These liquids are largely hydrocarbons, which do not substantially wet the fines, and subsequently trickle down through the fines to the bottom of the containment infrastructure, where they are collected and removed.

Additionally, the fines layer serves as a filter to remove suspended particulates present in the hydrocarbons as the collected hydrocarbons are condensed and resulting liquids pass downward through the fines layer for collection and removal from the infrastructure. Such suspended particulates are attracted and adhere to the surface of the fines particles resulting in collected produced hydrocarbons that are free, or essentially free, of suspended particulates. Thus, the hydrocarbons percolate downward through the fines layer with concomitant filtration and removal of a substantial portion of suspended particulates from the hydrocarbons.

The infrastructure can be formed using any suitable approach. However, in one aspect, the structure is formed from the floor up. The formation of the wall or walls and filling of the enclosure with the comminuted earthen material can be accomplished simultaneously in a vertical deposition process where materials are deposited in a predetermined pattern. For example, multiple chutes or other particulate delivery mechanisms can be oriented along corresponding locations above the deposited material. By selectively controlling the volume of particulate delivered and the location along the aerial view of the system where each respective particulate material is delivered, the layers and structure can be formed simultaneously from the floor to the crown. The sidewall portions of the infrastructure can be formed as a continuous upward extension at the outer perimeter of the floor and each layer present, bentonite amended soil layer, fines layer, and, if present membrane and/or asphalt liner, are constructed as a continuous extension of the floor counterparts. During the building up of the sidewall, the comminuted hydrocarbonaceous material can be simultaneously placed on the floor and within the sidewall perimeter such that, what will become the enclosed space, is being filled simultaneously with the rising of the constructed sidewall. In this manner, internal retaining walls or other lateral restraining considerations can be avoided. This approach can also be monitored during vertical build-up in order to verify that intermixing at interfaces of layers is within acceptable predetermined tolerances (e.g. maintain functionality of the respective layer). For example, excessive intermingling of BAS with fines may compromise the sealing function of the BAS layer. This can be avoided by careful deposition of each adjacent layer as it is built up and/or by increasing deposited layer thickness.

As the build-up process nears the upper portions, the convex bulged crown can be formed using the same delivery mechanisms described above and merely adjusting the location and rate of deposition of the appropriate material forming the crown layer. For example, when the desired height of the sidewall is reached, sufficient amount of the comminuted hydrocarbonaceous material can be added to form a bulge or crown. This bulge or crown of the comminuted hydrocarbonaceous material can extend above an imaginary horizontal plane that is substantially parallel to surrounding local surface or existing grade and that runs from the tops of the side walls of the containment system In other words, there will be an overfill of such material within the space defined by the inner perimeter of the insulative layer (e.g. ceiling, floor and sidewalls). The volume of the comminuted earthen material used to form the crown is referred to as the "crown volume." Similarly, the volume of space that is circumscribed by floor, sidewalls, and the above-described imaginary horizontal plane can be referred to as the target-volume.

The desired crown volume necessary to prevent excessive subsidence (i.e. subsidence that results in a volume that is less than the target volume) can vary depending on a number of factors. One factor that can affect the desired crown volume is the volume of the containment system. Another factor that can affect the desired crown volume is the nature of the comminuted earthen material placed in the sealed containment system. For example, if the sealed containment system includes comminuted oil shale the subsidence may be greater than if the comminuted material is tar sands. Similarly, oil shale containing large amounts of hydrocarbonaceous material may have greater subsidence than oil shale that has lesser amounts of hydrocarbonaceous material. Similarly, particulate size can affect the degree of subsidence and whether particle size distributions are relatively larger or narrower. Still another factor that can affect the desired crown volume can be the depth of the containment system, i.e. the length of the sidewalls. Deeper containment systems typically require larger crown volumes as compared to shallower containment systems. When the desired overfill is achieved, a bulged convex crown of the infrastructure can be completed by the placement of a fines layer and bentonite amended soil layer over the bulge. As previously described, optionally, an inner asphalt layer can be placed between the bulge of comminuted hydro carbonaceous material and fines layer and an impermeable layer can optionally be placed over the amended bentonite soil layers.

Regardless of the specific approach use to form the infrastructure, the floor is generally first formed and includes placement of an optional outside membrane, a bentonite amended soil layer and a fines layer. Optionally, an asphalt layer can be placed adjacent the inner surface of the fines layer. Depending on the particular installation, heating conduits, collection conduits, fluid delivery conduits, collection trays, and/or other structures can optionally be embedded into the deposited particulate materials. An infrastructure comprising an enclosed space filled with comminuted hydro carbonaceous material is thus formed. The infrastructure as formed can also have overburden placed over the bulged crown. If the sealed containment system is to be formed below existing grade, a cavernous pit may be prepared by excavation or other suitable steps. If not located in a subterranean location, a soil or other supporting berm can surround the sidewall and support the layer materials as they are deposited.

With the above description in mind, FIG. 1 depicts a side view of one embodiment showing a containment infrastructure 100 for the extraction of hydrocarbons from comminuted hydrocarbon containing materials 126. The infrastructure 100 is shown where an existing surface or excavated grade 135 is used primarily as support for the floor portion 110 of the infrastructure. The floor portion 110 comprises an outer membrane 112, a bentonite amended soil layer 113, an insulating fines layer 114 and, optionally, an inner asphalt layer 111. Building upward from the floor portion 110 is a continuous sidewall portion 115 comprising an outer membrane 119, a bentonite amended soil layer 118, a fines layer 117, and, optionally an inner asphalt layer 116. As previously noted, the various layers can be formed simultaneously from bottom to top as the infrastructure 100 is constructed. Also, a comminuted earthen material 126, such as oil shale, tar sands, coal and the like can be placed on the floor and fill what will become the enclosed volume 125 as the walls are constructed. Depending on the placement of the system, the exterior surface of sidewall portion 115 and floor portion 110 can be supported by a berm or, if excavated, the base and walls of an excavation. Each of the floor, walls, and crown portions of the infrastructure collectively form the insulating and containing layers. Generally, these portions of the layers are a continuous layer surrounding the comminuted earthen material.

Upon completion of sidewall portion 115, and whether filled simultaneously or separately, a comminuted earthen material 126 is placed within what will become enclosed volume 125 sufficient to overfill or extend above the sidewall portion 115 to form a convex bulge. A convex crown or cap portion 120 can be formed over bulge of the comminuted earthen material 126 and is contiguous with sidewall portion 115. As with the floor and sidewall, bulged crown 120 may have multiple layers comprising an optional outer membrane 124, a bentonite amended soil layer 123, a fines layer 122, and, optionally an inner asphalt layer 121. Overburden 136 can also cover the bulged crown if desired. Also, material used as overburden 136 can be used as a sidefill or floor to engulf or surround the infrastructure.

The various layers of the floor, sidewall and bulged crown are continuous in direct contact or communication with similar materials such that, for example, the fines layers, 114, 117 and 122 are one continuous layer surrounding the enclosed volume. The same holds true for the outer membrane layers 112, 119 and 124, the bentonite amended soil layers 113, 118 and 123, and, if used, can also be true of the inner asphalt layers 111, 116 and 121. It is to be noted that the thickness of each layer may not be uniform throughout the infrastructure. It is the presence of the layer that is important and the thickness of each layer is not critical provided it is functional for its intended purpose.

Various conduits for the ingress of heat, solvents, leaching fluids and the like and egress of extracted hydrocarbons, rich solvents and leachates can be positioned within the enclosed volume 125 as described in previously cited U.S. application Ser. No. 12/028,569, filed Feb. 8, 2008 which is incorporated herein in its entirety by reference. The layered floor, sidewall and bulged convex crown provide insulation to retain heat within the enclosed space to extract hydrocarbons from the comminuted hydrocarbonaceous material. A positive pressure is maintained within the enclosed volume 125 sufficient to insure that air does not flow from the surrounding atmosphere into the containment structure. Some hydrocarbons are extracted as liquids and some as gases or vapors. Some condensation of hydrocarbons takes place within the enclosed space 125 and, along with extracted liquid hydrocarbons, can be removed from within the enclosed space by means of a drain or drains (not shown) appropriately positioned within the system. Some extracted gases or vapors can also pass through the inner surface of the enclosed volume into the fines layers of the infrastructure where there is a temperature gradient between the inner and outer walls of the fines. As a result the gases or vapors cool and are condensed. The condensed liquids from such vapors or gases in the fines layer percolate downward through such layer where they are also removed from the system by appropriate drains. The condensing of such vapors or gases in the fines layer, along with the positive pressure within the enclosed volume, function as an auto condensing pump to draw additional vapors or gases from within the enclosed volume into the fines layer for further condensation and hydrocarbon removal.

The removal of hydrocarbons from the comminuted hydrocarbonaceous material can, over time, cause subsidence of the hydrocarbon lean material within the enclosed volume. Such subsidence causes compressive stress in the bulged convex crown which likewise subsides. Such subsidence results in the crown lessening in surface area as it flattens and recedes downward with the concomitant increase in the thickness of the layers in the bulged convex crown and particularly in the bentonite amended soil layer. This feature retains the integrity of the enclosed volume and prevents the exposure of its contents to the outside atmosphere.

Figure 4:
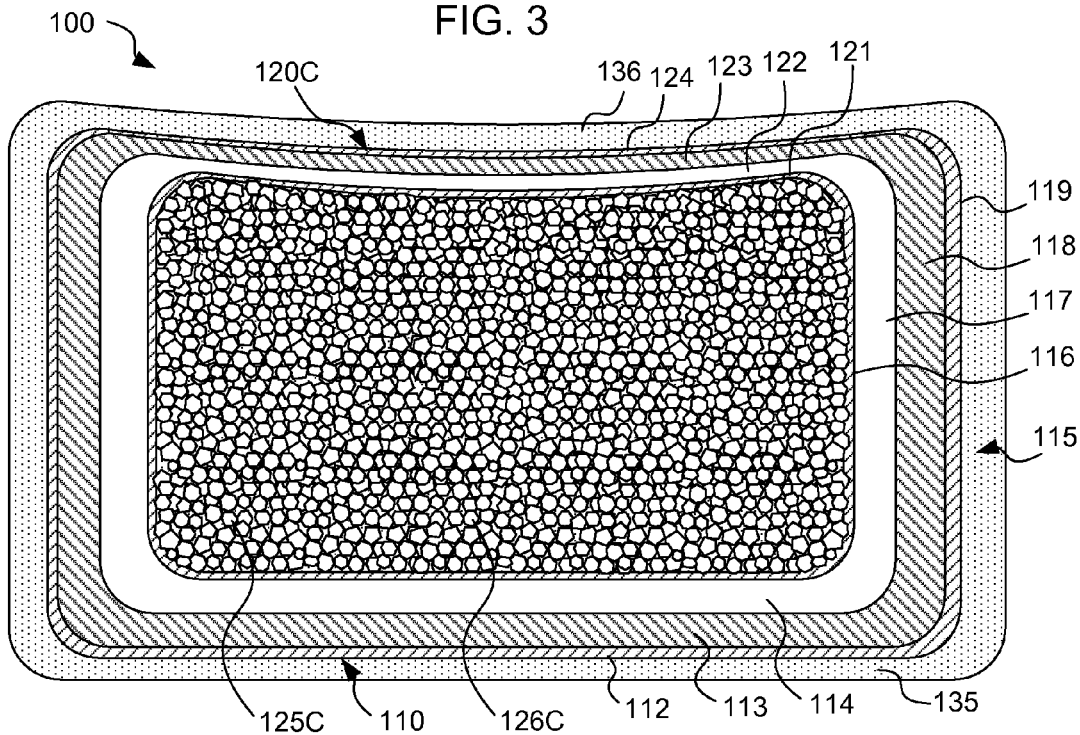
FIG. 4 is a side cutaway of the infrastructure shown in FIG. 1 wherein the convex bulged crown has been compressed and then partially expanded to a concave surface due to subsidence of the comminuted material within the enclosed volume.

When no crown or bulge is present and the top of the sealed system is substantially parallel to the existing grade prior to subsidence, the removal of the hydrocarbons from the system can result in subsidence within the system that can result in a progressively more concave shape of the top of the system (See FIG. 4). This can produce progressively greater tensile stresses in the surface and near surface materials. These materials have relatively very low tensile strength, and therefore can fail in tension, resulting in cracks or openings in the system that can allow for undesirable escape of compounds from the system into the environment and can allow water to enter the system. As discussed above, the presence of the crown or bulge on the top of the system alters the stresses placed on the lined infrastructure of the system when subsidence occurs. Specifically, because of the arched contour of the lining over the crown layer, when subsidence occurs the stresses within the lined infrastructure are primarily compression stresses rather than tensile stresses. Thus, as the crown subsides the layers compress together, particularly in the corner regions, and the propensity of the layers to fail is significantly reduced or eliminated.

Figure 2:
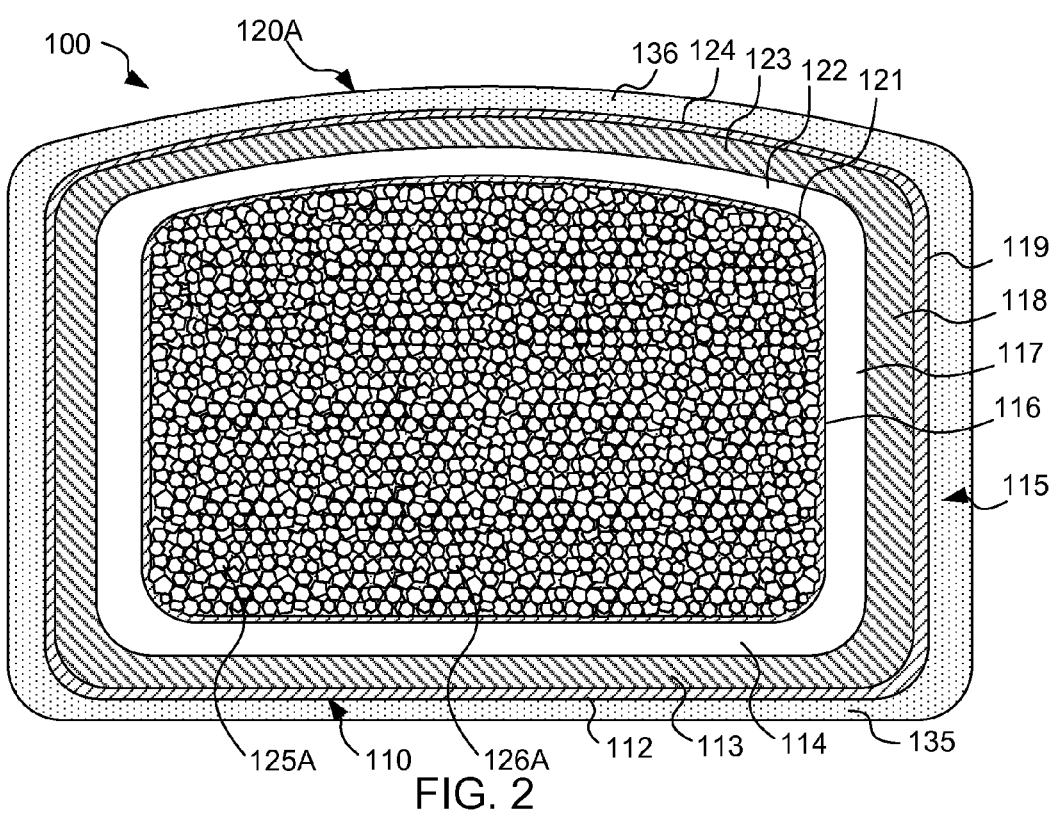
FIG. 2 is a side cutaway of the infrastructure shown in FIG. 1 wherein the bulged crown is partially compressed due to subsidence of the comminuted material within the enclosed volume with the convex bulged crown extending above the existing grade to a lesser extent than shown in FIG. 1.

FIG. 2 is a side cutaway view as in FIG. 1 illustrating a lessening of the bulge in the convex bulged crown 120A due to subsidence of the comminuted materials 126A within the enclosed volume 125A.

Figure 3:
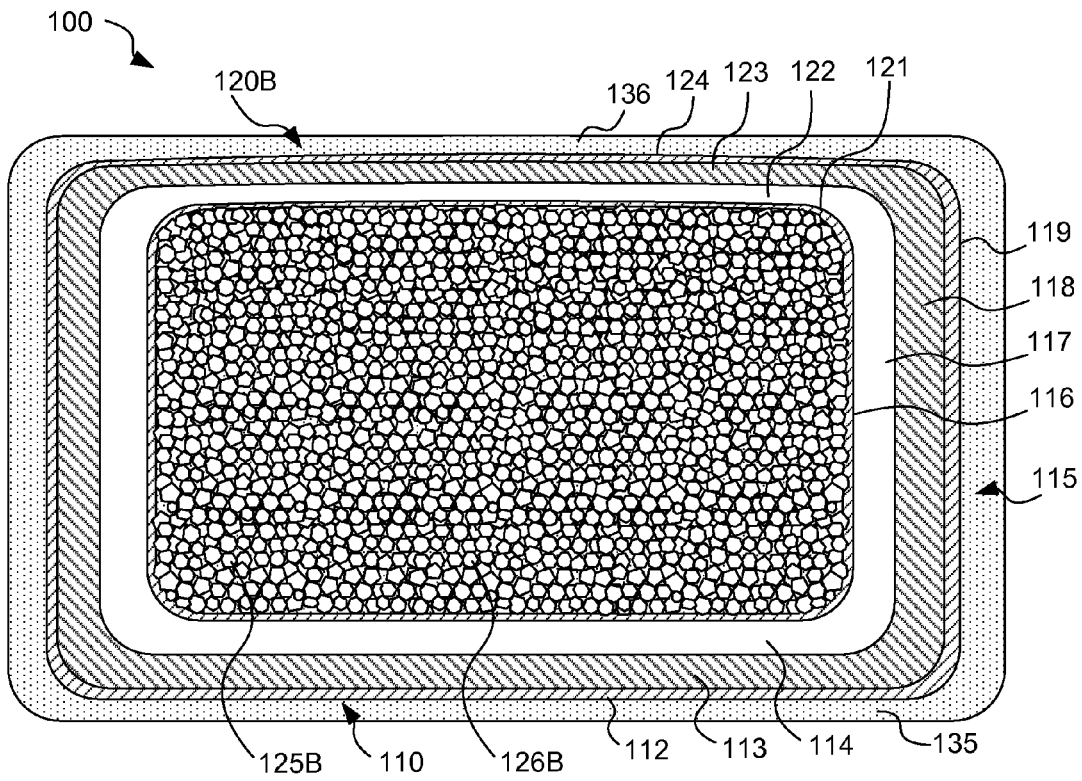
FIG. 3 is a side cutaway of the infrastructure shown in FIG. 1 wherein the convex bulged crown is compressed to an essentially horizontal plane parallel to the local surface due to subsidence of the comminuted material within the enclosed volume.

FIG. 3 is a side cutaway view as in FIG. 1 illustrating that the initially convex crown 120 has receded in surface area to a crown 120B that is essentially in a flat position following the subsidence of the comminuted materials 126B within the further reduced enclosed volume 125B. In this position the overall terrain wherein the infrastructure is located is returned to essentially the environment that existed before construction of the infrastructure and use thereon in removing hydrocarbons therefrom.

FIG. 4 is a side cutaway view as in FIG. 1 illustrating a concave crown 120C that has receded to an essentially concave position with increased surface area which is less desirable following the subsidence of the comminuted materials 126C within the enclosed volume 125C. As downward movement progresses, and the crown shape evolves from convex to concave, compressive stresses in the crown (parallel to the crown surface, decrease and then become tensile stresses (parallel to the crown surface) which can result in the rupture of the crown causing exposure of the lean comminuted materials within the enclosed volume 125C and possibly the release or exposure of unwanted vapors or other materials to the outside environment.

It is noted that the materials used for the fines layer and bentonite amended soil layers do not have significant tensile strength as they are particulate and/or hydrated materials. Therefore, some minimal degree of concavity may be tolerated without losing integrity of the infrastructure; however, such tolerance is modest such that operation and design of the infrastructure should take care to avoid substantial concavity in the final state of the infrastructure. One factor in determining the degree of tolerance is the integrity of the infrastructure with respect to retaining fluids within the infrastructure, except for egress via dedicated outlets. The degree of overfill to create the bulged crown will be a function of the comminuted material within the enclosed volume and the anticipated degree of subsidence. This may be determined on a case by case basis taking into consideration the hydrocarbonaceous material, size and porosity of the earthen material containing the hydrocarbons and other factors available to one skilled in the art It is to be understood that the above-referenced arrangements are illustrative of the application for the principles of the present invention. Thus, while the present invention has been described above in connection with the exemplary embodiments of the invention, it will be apparent to those of ordinary skill in the art that numerous modifications and alternative arrangements can be made without departing from the principles and concepts of the invention as set forth in the claims.

What is claimed is:

1. A sealed containment system for subsiding earthen materials, comprising:
   a. a lined containment infrastructure including a floor portion, a convex bulged crown portion, and a sidewall portion connecting the floor portion and the convex bulged crown portion to form a sealed enclosed volume which restricts flow of fluid outside the lined containment infrastructure, said enclosed volume having at least one fluid outlet; and
   b. a comminuted earthen material subject to subsidence filling the enclosed volume, wherein the comminuted earthen material serves as a support for the bulged crown portion.

2. The system of claim 1, wherein each of the floor portion, the convex bulged crown portion and the sidewall portion include at least an inner insulative layer and an outer impermeable seal layer.

3. The system of claim 2 wherein the inner insulative layer and impermeable seal layer are continuous layers across the floor portion, the convex bulged crown portion and the sidewall portion.

4. The system of claim 3, wherein the lined containment infrastructure is configured such that as the comminuted earthen material within the enclosed volume subsides as a result of hydrocarbon removal, the enclosed volume will decrease and the convex bulged crown portion will flatten such that a surface area thereof will lessen while continuously sealing the enclosed volume from outside atmosphere.

5. The system of claim 3, wherein as a surface area of the convex bulged crown flattens the bulged crown portion thickens.

6. The system of claim 2, wherein the inner insulative layer includes a fines layer and the outer impermeable seal layer includes a hydrated bentonite amended soil layer.

7. The system of claim 6, further containing an impermeable outer membrane outwardly adjacent the outer impermeable seal layer.

8. The system of claim 6, further comprising an asphalt seal layer inwardly adjacent the fines layer.

9. The system of claim 6, further comprising an overburden layer over at least the bulged crown portion.

10. The system of claim 6, wherein the fines layer is sufficient to provide a temperature gradient such that, at an inner fines surface temperature is at a heated temperature of the comminuted earthen materials from which hydrocarbons are being extracted from within the enclosed volume and a temperature at an outer surface is insufficient to dehydrate the hydrated bentonite amended soil layer.

11. The system of claim 10, wherein the fines layer is configured to receive and condense extracted hydrocarbons along with hydrocarbon liquids from within the enclosed volume such that the hydrocarbons percolate downward through said fines layer with concomitant filtration and removal of a substantial portion of suspended particulates from said hydrocarbons.

12. The system of claim 1, wherein the lined containment infrastructure was formed by simultaneous deposition of materials vertically from a bottom of the infrastructure up such that the infrastructure is substantially loose particulate material, except for any hydrated bentonite amended soil.

13. The system of claim 1, wherein the comminuted earthen material is selected from the group consisting of oil shale, tar sands, coal, contaminated soil, metal rich ore, and combinations thereof.

14. The system of claim 1, wherein the comminuted earthen material is a hydro carbonaceous material.

15. The system of claim 1, further comprising heating conduits buried in the comminuted earthen material and connected to a heat source such that the heating conduits heat the comminuted earthen material.

16. A method of forming a sealed containment system for subsiding earthen materials, comprising:
   a. preparing a cavernous pit for deposition of the sealed containment system;
   b. depositing a plurality of particulate materials in a predetermined pattern in a bottom up fashion so as to form a particulate body having a core body of comminuted earthen material subject to subsidence surrounded by an inner insulative layer and an outer impermeable seal layer so as to form the sealed containment system around the comminuted earthen material, such that the system has an upper convex bulged crown portion supported by the earthen material and configured to compensate for subsidence of the earthen material.

17. The method of claim 16, wherein the plurality of particulate materials includes the comminuted earthen material, crushed fines as the inner insulative layer, and bentonite amended soil as the outer impermeable seal layer.

18. The method of claim 16, wherein the depositing maintains a substantially horizontal upper profile as the particulate body is built up.

19. The method of claim 16, further comprising pausing the depositing for at least one time and laying conduits configured for use as heating and/or collection conduits.

20. The system of claim 1, wherein the comminuted earthen material is subject to sufficient subsidence to substantially flatten the bulged crown portion.

* * * * *